June 5, 1956
G. SKUROW
2,749,530
BATTERY CONTACT CLAMPS
Filed May 12, 1953
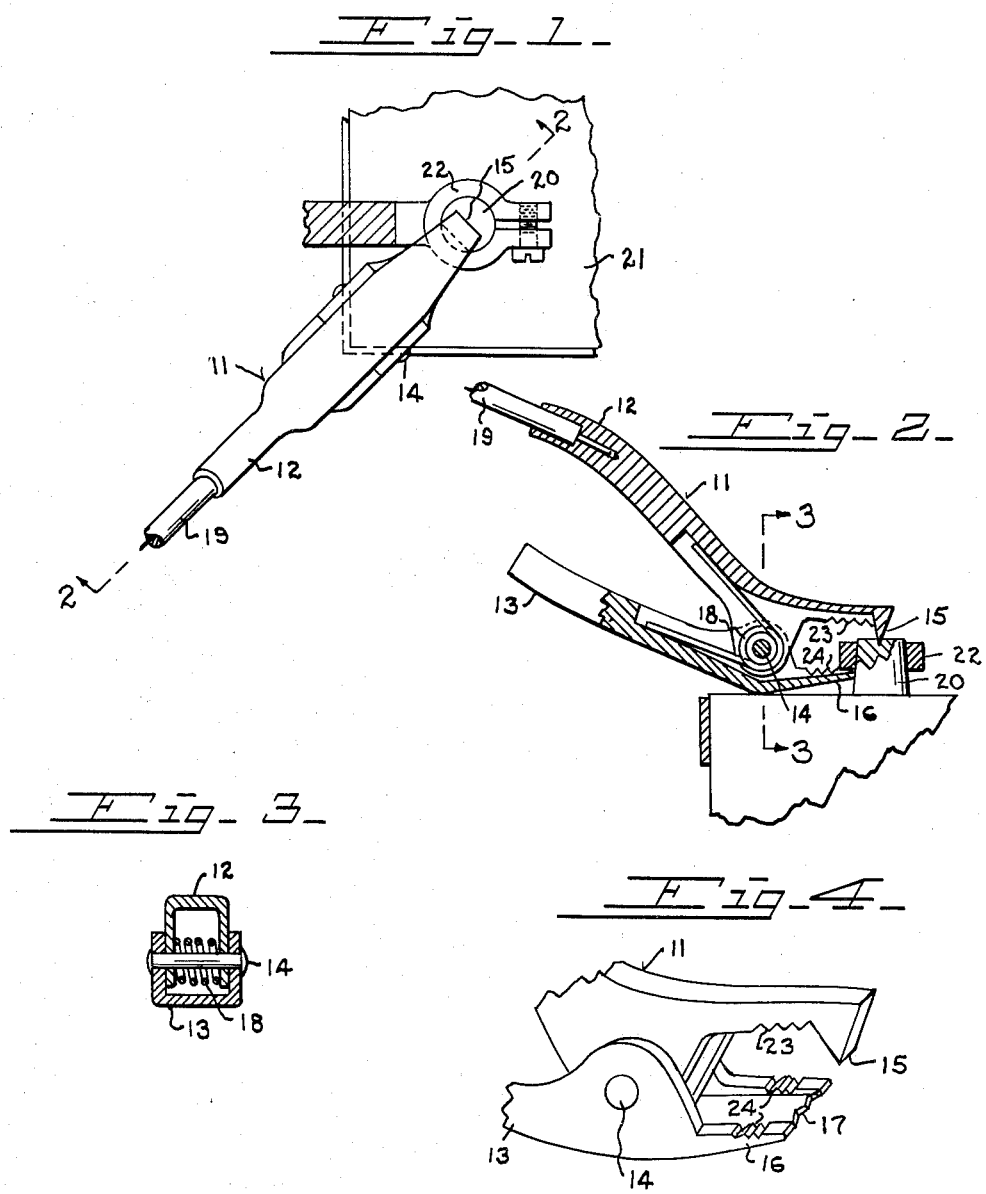
INVENTOR.
GILBERT SKUROW.
BY
ATTORNEY.

United States Patent Office 2,749,530
Patented June 5, 1956

2,749,530
BATTERY CONTACT CLAMPS

Gilbert Skurow, Cincinnati, Ohio

Application May 12, 1953, Serial No. 354,594

1 Claim. (Cl. 339—228)

This invention relates to an improved battery contact clamp in the form of tongs, particularly useful in connecting a quick battery charger to the terminals of a storage battery for charging the battery while it is in the automobile.

The terminals and cable connections on storage batteries used in automobiles after a period of time become corroded, and with present clamps, unless these terminals are thoroughly cleaned a good contact cannot be made between the clamp and the terminal with the result that the battery is not properly charged, and further than that, the charger and connections become overheated with resultant damage to the charger. With my improved clamp a positive connection is made to the battery terminal post and is constructed to form a good connection regardless of the corroded condition of the terminal post or the tightness of the cable connected to the battery post, whereby the full current will flow to the battery without overheating the charger or the connections thereto.

The object of my invention is to provide a battery contact clamp in the form of tongs with a chisel prong on one of the jaws and the other jaw forming an engaging member having a curved serrated edge for engagement under the battery cable clamp.

My invention will be further readily understood from the following description and claim, and from the drawings, in which latter:

Fig. 1 is a plan view of my improved clamp applied to a battery.

Fig. 2 is a section view of the same, taken in the plane of the line 2—2 of Fig. 1.

Fig. 3 is a detail section, taken in the plane of the line 3—3 of Fig. 2.

Fig. 4 is a perspective view of the jaws.

My improved clamp is in the form of tongs 11 having handles 12 and 13 being pivoted as at 14 with the extension of handle 12 having a downwardly extending chisel jaw 15 and the handle 13 having an upwardly extending member 16 provided with a curved serrated edge 17. A coil spring 18 surrounds the pivot 14 with the extending ends of the spring engaging the handles to cause the jaws to normally be maintained in closed position. An electrical cable 19 is attached in an aperture in the handle 12 to form a direct connection to the jaw 15.

When it is desired to charge a battery without disconnecting it from the electrical circuit of the automobile or removing the battery therefrom, the charger is moved to a position adjacent to the automobile and the charger is connected by means of improved clamps to the positive and negative terminals 20 of the battery 21 by opening the jaws of the clamp and engaging the chisel jaw 15 with the terminal post 20 and engaging the member 16 under the battery cable clamp 22. In this position due to the shape of the lower jaw, the handle extends in an upward position, thus preventing any possibility of contact with the metal battery holder.

The jaws of the clamp are separated by means of converging pressure on the two handles to permit the serrated jaw to be inserted under the battery cable clamp 22 with the chisel jaw on top of the battery terminal post 20. The chisel jaw is tapped lightly to embed the chisel edge in the post to form a positive electrical connection between the charger and the battery terminal post. The cable extending from the charger is connected to the handle having the chisel jaw for forming a direct connection to cause the full current to flow from the charger to the terminal post of the battery, regardless of the positive connection of the battery cable clamp 22.

It will be apparent from the foregoing, that I have devised a simple clamp which can be quickly and positively connected to the battery post for accomplishing the desired charging of the battery. It will be apparent that my improved clamp can also be used sidewise on the battery post for charging batteries that are removed from the automobile and wherein the entire terminal post is exposed. In such cases the serrated faces 23 and 24 grip the sides of the post and make a positive connection under the pressure of the spring.

Having thus fully described my invention, what I claim as new and desire to secure by Letters Patent, is:

A battery contact clamp for use in charging storage batteries within an automobile comprising a pair of members pivoted together, hand gripping means on one end of said members, one of said members provided with a downwardly extending chisel edge for contact with the upper face of a battery post, the other member provided with a flat serrated surface and a curved serrated forward edge of less length than the member with the chisel edge, a spring about said pivot for urging said members together, whereby the short member can be positioned below a battery clamp and the chisel edge firmly engaged with the top surface of the battery post, and an electrical connection to said member having the chisel edge.

References Cited in the file of this patent
UNITED STATES PATENTS

| | | |
|---|---|---|
| 1,221,524 | Frankel | Apr. 3, 1917 |
| 1,698,379 | Taylor | Jan. 8, 1929 |
| 2,000,665 | Neal | May 7, 1935 |
| 2,644,142 | Danberg | June 30, 1953 |

FOREIGN PATENTS

| | | |
|---|---|---|
| 936,469 | France | Feb. 16, 1948 |